Patented Apr. 30, 1946

2,399,443

UNITED STATES PATENT OFFICE 2,399,443

DESICCATED VIRUS VACCINES AND PROCESS OF PRODUCING SAME

Peter Masucci, Norwood, Pa., assignor to Sharp & Dohme, Incorporated, Philadelphia, Pa., a corporation of Maryland No Drawing. Application June 1, 1944, Serial No. 538,335

16 Claims. (Cl. 167—78)

This invention relates to improvements in the production of vaccines for virus diseases. It includes improvements in processes for the production of such products, and improved products of increased stability.

A number of virus vaccines are known, including those for equine encephalomyelitis, rabies, hog cholera, foot and mouth disease virus, canine distemper, and other virus diseases. These vaccines are commonly produced by growing the virus on a suitable medium such as chicken embryo, brain tissue or other animal tissue, grinding or suspending the resulting product in water and treating it with formaldehyde or other aldehyde to attenuate or kill the virus and destroy its ineffective properties without destroying its antigenic properties. The virus vaccines so produced are relatively unstable, and deteriorate more or less rapidly, losing their effectiveness, even when kept in the standard biological cold room. Equine encephalomyelitis vaccine, for example, is commonly sold with a six months' dating.

In recent years, the stabilization of biological products by desiccation from the frozen state has been developed to the stage where it is commercially applied to a number of materials. In general, the process of stabilization involves freezing the aqueous biological material and removing the water therefrom through the use of a high vacuum while maintaining the material frozen, with the production of a desiccated product of a porous nature which rapidly redissolves upon the addition of water to form a restored product which, from a therapeutic standpoint, is the substantial equivalent of the starting material. Such desiccated products are relatively stable and many of them may be stored for long periods of time, at ordinary room temperatures or even higher temperatures, without substantial deterioration.

The virus vaccines, however, are not susceptible of preservation or stabilization by such procedures, because, after freezing and desiccation by sublimation, the desiccated product will not upon the addition of water redissolve to form a solution or suspension equivalent to the initial material, but rather tends to form a stringy mass which is not suitable for injection.

The present invention provides improvements in this desiccation operation which permit the production of desiccated products which have the stability characteristic of biological products desiccated from a frozen state and which dissolve readily in water to form solutions or suspensions which are the equivalent of the initial materials and may be effectively used therapeutically; and includes the desiccated products so produced.

In accordance with the present invention, the liquid virus vaccine is prepared in the usual way, and, prior to subjecting it to desiccation from the frozen state, is treated with a material which is reactive with formaldehyde and which does not denature the product or inactivate the antigens therein. A number of materials may be used for this purpose, most of them being characterized by the fact that they are reactive with aldehydes, particularly formaldehyde, to form complexes. Included are sodium bisulfite, sodium sulfite (subject to certain limitations hereafter discussed) mixtures of the two, sulfamates, particularly sodium sulfamate, amino acids such as glycine and other protein hydrolysates.

It appears that the materials which are most useful for the purpose are compounds which contain an aldehyde-reactive amino radical or an aldehyde reactive sulfite radical. The mechanism of the new process is not known, that is, it is not known whether the improved results which are obtained are due to the removal of excess aldehyde from the vaccine or to other factors, such as the breakdown of certain aldehyde protein complexes formed in the vaccine or factors quite removed from either of these.

In carrying out the invention, certain precautions, which to some extent depend upon the reagent used, must be observed.

Thus if sodium bisulfite is used, the resulting treated vaccine will have a pH which may be as low as 4.5 and may approximate the isoelectric point of the vaccine, with resulting precipitation of protein material and in activation of the vaccine, as the antigens appear to be included in the precipitated material. For this reason, it is important, where sodium bisulfite is used, to subject the treated vaccine to freezing within a relatively short time after the addition of the sodium bisulfite, for example, within a period of less than one hour. In some instances, periods as long as 4 hours have elapsed between the addition of the sodium bisulfite and the freezing, without harmful effect on the product, but it is inadvisable to permit such delay in the freezing. A sodium bisulfite treated product, with a pH of a little over 4, will ordinarily restore after freezing and desiccation, to give a liquid product with a pH around 7, which is advantageous, as all of these products are administered by injection.

Alternatively, the vaccine may be treated with sodium bisulfite, with consequent reduction in its pH to around 4 or a little more and then may be treated with a suitable alkaline material, such as caustic soda (dilute), or sodium carbonate to bring its pH up to around 7. In such a case it is not necessary to proceed as promptly with the freezing and desiccation, as the danger of protein precipitation because of isoelectric phenomena is avoided.

The use of sodium sulfite instead of sodium bisulfite introduces the difficulty that the final product, when restored, has a pH which may be as high as 10 or 11, which renders its use by injection disadvantageous. Such difficulty may be largely overcome if the product is restored with the use of a slightly acidified liquid, but in many instances, this introduces impractical limitations upon the use of the product. Mixtures of sodium bisulfite and sodium sulfite, conveniently obtained by adjustment of the pH of a solution of one or the other, may be used with advantage, and in some instances, avoid to a considerable extent the disadvantages of the use of either alone in that the pH may be above the isoelectric point and yet sufficiently low on restoration so that the product can be injected without undue pain.

Other salts of sulfurous acid, such as potassium bisulfite, calcium bisulfite (usually obtainable only in solution), amine salts, and the like, may be used, although the sodium salts are ordinarily to be preferred because of availability and low cost.

The sulfamates, and particularly sodium sulfamate, appear to be even more useful than the sulfites. Their pH is approximately 7, and they therefore introduce no complications resulting from either increase or decrease of the pH of the initial liquid product or the final desiccated product. Other sulfamates than the sodium salt, for example, calcium or potassium sulfamate or the amine sulfamates, or even substituted sulfamates, such as phenyl sulfamic acid sodium, may be used.

A wide range of amino acids may also be used in carrying out the invention, and these compounds, being amphoteric in nature, introduce no complications because of variation in the pH of the initially treated or the final product. Glycine may be used, as may nearly any of the amino acids resulting from the hydrolysis of proteins, including the composite product containing a large proportion of amino acids resulting from the hydrolysis of proteins. Included in the amino acids which may be used are the alanines, glutamic acid, hippuric acid, histidine, lysine, aspartic acid, taurine, and others.

Ammonia does not produce useful results. The requirement for an effective reagent for carrying out the invention appears to be the presence in it of a group, such as an amino or sulfonic group which is reactive with formaldehyde or other aldehyde and which does not adversely affect the vaccine, as by denaturation or inactivation of antigens.

The invention will be illustrated by the following specific examples, dealing with the production of equine encephalomyelitis vaccine, but it is not limited thereto.

Example 1.—Encephalomyelitis virus, western type, is grown upon live chicken embryo. The embryonic tissue containing the virus is finely ground and to it is added enough physiological saline solution to make a 20 to 30% suspension. The virus concentration in this suspension is high, 0.10 cc. of a $10^{-6}$ to $10^{-9}$ dilution injected intracerebrally killing guinea-pigs within 10 days. This suspension is treated with about 0.40% of formalin (40% formaldehyde in water) and allowed to stand at room temperature for 48 hours with shaking. In this way the virus is killed and is no longer able to infect animals, but the product has antigenic properties and is an effective vaccine. It is centrifuged to remove coarse tissue particles and the centrifuged material is kept in a cold room. The procedure described is one of the standard methods of making equine encephalomyelitis vaccine. Each batch so produced is tested for potency by standard procedure, any batches which are substandard being discarded.

To the product is added sodium bisulfite solution, 100 cc. of a 10% solution being added to 1000 cc. of the vaccine. The resulting product is then frozen, advantageously within a period of less than one hour after the addition of the sodium bisulfite, and in any event before the formation of a precipitation of protein material, which ordinarily takes place not later than 24 to 48 hours after the addition of the sodium bisulfite. If precipitation occurs because the product is not frozen promptly after the addition of the bisulfite, the material should be discarded because after such precipitation, the product has reduced antigenic properties. The frozen material is subjected to desiccation from the frozen state according to accepted procedure and the resulting desiccated product is sealed in ampules or other containers. In use, it is simply necessary to add water or other aqueous liquid to the desiccated material, whereupon it rapidly redissolves or resuspends forming a vaccine the full equivalent of the initial product.

Following the procedure outlined, the pH of the vaccine after the addition of sodium bisulfite but before freezing will be about 4.2, and the pH of the restored product will be about 7.0.

Example 2.—A virus vaccine is prepared and treated with sodium bisulfite as in Example 1. The pH of the resulting product is raised to about 6.8 by the addition of $$\frac{N}{10} NaOH$$

solution, about 275 cc. being required for the 1000 cc. of original vaccine. This product on dehydration as described restores very satisfactorily, giving a restored product with a pH around 7.1.

Example 3.—A virus vaccine is prepared as in Example 1 and to 1000 cc. of it is added 100 cc. of a 20% solution of glycine. The addition of the glycine does not appreciably change the pH of the product. It is then desiccated by sublimation from the frozen state giving a dry product which is stable and is readily restored by the addition of water.

Example 4.—A virus vaccine is prepared as in Example 1 and to 1000 cc. of it is added 70 cc. of 10% solution of sodium sulfamate, after which the product is desiccated by sublimation from the frozen state. The addition of the sodium sulfamate does not appreciably change the pH of either the initial product or the final restored product.

I claim:

1. The process of producing aldehyde-killed virus vaccines in desiccated form which includes the step of adding to the vaccine, prior to the operations incident to desiccation, a non-toxic aldehyde-reactive reagent which does not destroy virus antigens.

2. The process of producing aldehyde-killed virus vaccines in desiccated form which includes the step of adding to the vaccine, prior to the operations incident to desiccation, an aldehyde-reactive sulfite reagent.

3. The process of producing aldehyde-killed virus vaccines in desiccated form which includes the step of adding to the vaccine, prior to the operations incident to desiccation, an aldehyde-reactive amino reagent.

4. The process of producing aldehyde-killed virus vaccines in desiccated form which includes the step of adding to the vaccine, prior to the operations incident to desiccation, an aldehyde-reactive amino acid.

5. The process of producing aldehyde-killed virus vaccines in desiccated form which includes the step of adding to the vaccine, prior to the operations incident to desiccation, an aldehyde-reactive sulfamate.

6. The process of producing aldehyde-killed virus vaccines in desiccated form which includes the step of adding to the vaccine, prior to the operations incident to desiccation, an aldehyde-reactive alkali metal sulfite.

7. The process of producing aldehyde-killed virus vaccines in desiccated form which includes the step of adding to the vaccine, prior to the operations incident to desiccation, sodium bisulfite.

8. The process of producing aldehyde-killed virus vaccines in desiccated form which includes the step of adding to the vaccine, prior to the operations incident to desiccation, an alkali metal sulfamate.

9. Aldehyde-killed virus vaccines in desiccated form resulting from the desiccation of the vaccine after the addition thereto of a non-toxic aldehyde-reactive reagent which does not destroy virus antigens.

10. Aldehyde-killed virus vaccines in desiccated form resulting from the desiccation of the vaccine after the addition thereto of an aldehyde-reactive sulfite reagent.

11. Aldehyde-killed virus vaccines in desiccated form resulting from the desiccation of the vaccine after the addition thereto of an aldehyde-reactive amino reagent.

12. Aldehyde-killed virus vaccines in desiccated form resulting from the desiccation of the vaccine after the addition thereto of an aldehyde-reactive sulfamate.

13. Aldehyde-killed virus vaccines in desiccated form resulting from the desiccation of the vaccine after the addition thereto of an alkali metal sulfite.

14. Aldehyde-killed virus vaccines in desiccated form resulting from the desiccation of the vaccine after the addition thereto of sodium bisulfite.

15. Aldehyde-killed virus vaccines in desiccated form resulting from the desiccation of the vaccine after the addition thereto of an alkali metal sulfamate.

16. Aldehyde-killed virus vaccines in desiccated form resulting from the desiccation of the vaccine after the addition thereto of an amino acid.

PETER MASUCCI.